(12) United States Patent
Wu

(10) Patent No.: US 11,262,965 B2
(45) Date of Patent: Mar. 1, 2022

(54) DISPLAY DEVICE

(71) Applicant: Qisda Corporation, Taoyuan (TW)

(72) Inventor: Po-Fu Wu, Taoyuan (TW)

(73) Assignee: QISDA CORPORATION, Taoyuan (TW)

( * ) Notice: Subject to any disclaimer, the term of this patent is extended or adjusted under 35 U.S.C. 154(b) by 0 days.

(21) Appl. No.: 17/147,973

(22) Filed: Jan. 13, 2021

(65) Prior Publication Data

US 2021/0224012 A1    Jul. 22, 2021

(30) Foreign Application Priority Data

Jan. 22, 2020   (CN) .......................... 202010074381.3

(51) Int. Cl.
*G06F 3/14* (2006.01)
(52) U.S. Cl.
CPC ................. *G06F 3/1423* (2013.01)
(58) Field of Classification Search
CPC ......... H02N 15/00; G09F 19/02; G09F 19/12; G06F 1/1601; G06F 3/1423
See application file for complete search history.

(56) References Cited

U.S. PATENT DOCUMENTS

| | | | |
|---|---|---|---|
| 5,692,329 A * | 12/1997 | Tang ....................... | G09F 19/02 40/426 |
| 2008/0163528 A1* | 7/2008 | Soriano Ramos ... | B43K 23/001 40/711 |
| 2021/0175754 A1* | 6/2021 | Kim ....................... | F16M 13/02 |

* cited by examiner

*Primary Examiner* — Koosha Sharifi-Tafreshi
(74) *Attorney, Agent, or Firm* — Birch, Stewart, Kolasch & Birch, LLP

(57) ABSTRACT

The present invention provides a display device. The display device includes a display module, a first mounting frame, one or more electromotive driving elements, and a control module. The display module is disposed on and spaced from a setting surface and has a display surface. The first mounting frame is spaced from the display module and is disposed on the setting surface. The electromotive driving elements are disposed on the first mounting frame and face the display module relatively. The control module controls display of the display surface based on a display signal, and controls each of the electromotive driving elements to selectively generate an attractive force and a repulsive force with respect to the display module based on an actuation signal, so as to change a distance of the display module from the first mounting frame, a setting angle of the display module with respect to the setting surface, or a combination thereof.

20 Claims, 12 Drawing Sheets

DISPLAY DEVICE

BACKGROUND

Technical Field

The present invention relates to a display device. Specifically, the present invention relates to a displaceable display device.

Related Art

With increasing popularity of display devices, users expect that the display devices may have more functions or more variations besides the basic display function. For example, a cool appearance design and color factors may be added to some display devices such as a display device for electronic sports, to attract attention of users and audience. Alternatively, the display device may be equipped with a projecting lamp, to project a fixed pattern onto a specific region such as a table top. However, the setting is usually only limited to a fixed form, and is difficult to be changed with displayed content accordingly.

SUMMARY

Technical Means for Resolving the Problem

To resolve the foregoing problem, according to an embodiment of the present invention, a display device is provided, including a display module, a first mounting frame, one or more electromotive driving elements, and a control module. The display module may be disposed on and spaced from a setting surface and has a display surface. The first mounting frame is spaced from the display module and is disposed on the setting surface. The one or more electromotive driving elements are disposed on the first mounting frame and face the display module relatively. The control module controls display of the display surface based on a display signal, and controls each of the electromotive driving elements to selectively generate an attractive force and a repulsive force with respect to the display module based on an actuation signal, to change a distance of the display module from the first mounting frame, a setting angle of the display module with respect to the setting surface, or a combination thereof.

According to another embodiment of the present invention, a display device is provided, including: a housing seat, a first display module, a second display module, one or more electromotive driving elements, and a control module. The housing seat may be disposed on a setting surface. The first display module is disposed on the housing seat, and has a first display surface. The second display module is movably disposed on the housing seat, and has a second display surface. The one or more electromotive driving elements are disposed on the housing seat and face the second display module relatively. The control module controls display of the second display surface based on a display signal, and controls each of the electromotive driving elements to selectively generate an attractive force and a repulsive force with respect to the second display module based on an actuation signal, to change a distance of the second display module from the housing seat, a setting angle of the second display module with respect to the setting surface, or a combination thereof.

Technical Effects Compared to the Prior Art

The display device provided according to embodiments of the present invention, besides a display function, may further have a function of displacement. In this case, the display device according to the present invention may conduct displacement movement such as vibrate, shake, swing or overturn independently or corresponding to a displayed content, thereby increasing interestingness and variability during display. Therefore, according to the present invention, application fields and application modes of the display device may be increased.

DETAILED DESCRIPTION

Embodiments are described in the following, and a person of ordinary skill in the art should easily understand the spirit and the principle of the present invention with reference to the accompanying drawings. However, although some specific embodiments may be described in detail in this specification, the embodiments are merely examples, and should not be regarded as limitations or exhaustive meanings in terms of any aspect. Therefore, for a person of ordinary skill in the art, variations and amendments of the present invention should be apparent and may be achieved easily without departing from the spirit and the principle of the present invention.

Figure 1:
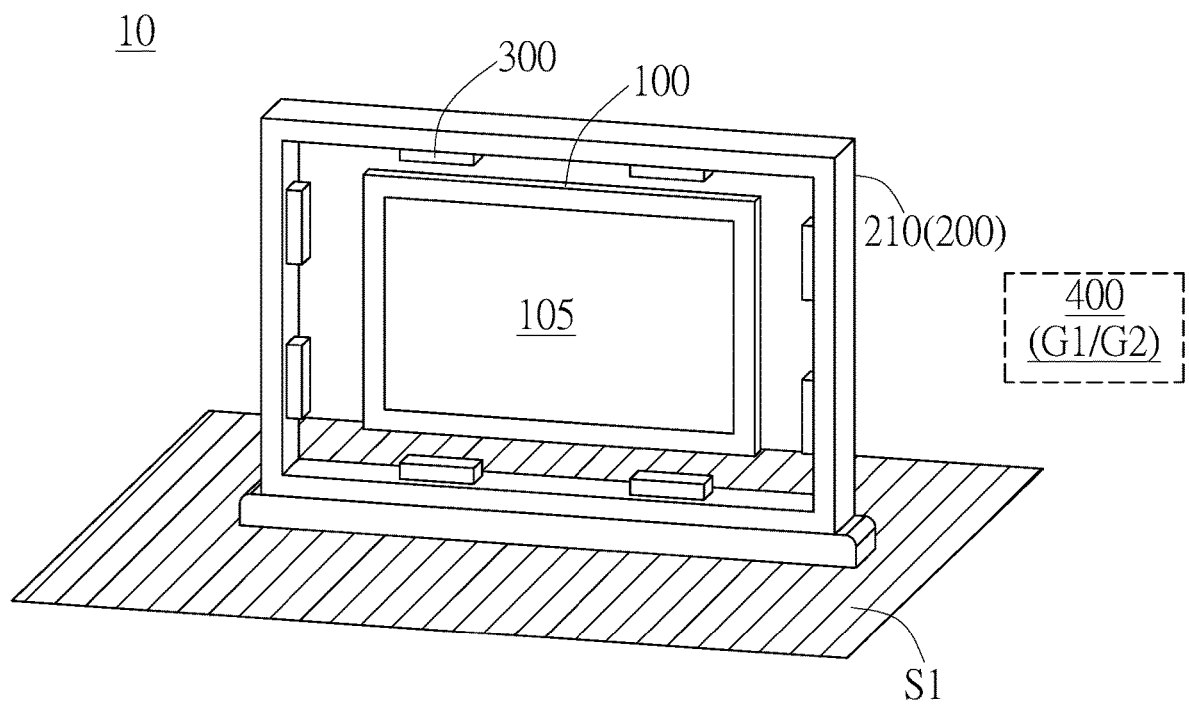
FIG. 1 is a schematic three-dimensional view of a display device according to an embodiment of the present invention.

Referring to FIG. 1, a display device 10 is provided according to an embodiment of the present invention. The display device 10 includes a display module 100, a setting frame 200, one or more electromotive driving elements 300 and a control module 400. The setting frame 200 may include at least a first mounting frame 210. Specifically, the first mounting frame 210 may be spaced from the display module 100 and is disposed on a setting surface S1 such as a table top, a floor, or any base surface on which the display device 10 may be disposed. Based on the above, the display module 100 is disposed corresponding to the first mounting frame 210. For example, as shown in FIG. 1, the display module 100 may be disposed to be framed by the first mounting frame 210, but the present invention is not limited thereto, and the display module 100 may be disposed corresponding to the first mounting frame 210 in any form.

In an embodiment, as shown in FIG. 1, the display module 100 may be disposed corresponding to the first mounting frame 210 without being in contact with the first mounting frame 210. Specifically, the one or more electromotive driving elements 300 are disposed on the first mounting frame 210, and the electromotive driving elements 300 face the display module 100 relatively. Based on the above, the electromotive driving element 300 may be an element with changeable properties after being powered on, for example, an electromagnet, a magnetic or piezoelectric material component, or an electrochromic polymer component, and the electromotive driving element 300 being an electromagnet is described as an example in the following. Based on the above, a balanced force may be applied to the display device 10 by selectively using attractive forces and repulsive forces generated after the electromotive driving elements 300 are powered on, to fix the display module 100, so that the display module 100 may be disposed on and spaced from the setting surface S1. That is, by selectively using the attractive forces and the repulsive forces generated by the electromotive driving elements 300, the display module 100 is fixed to a specific position relative to the first mounting frame 210, so that the display module 100 may be disposed on the setting surface S1 without being in contact with the setting surface S1.

The display module 100 may have a display surface 105 for displaying an expected video or image. In an embodiment, in an initial state, sides of the display module 100 may correspond to the first mounting frame 210 correspondingly disposed in a surrounding manner, and the display surface 105 may not correspond to the first mounting frame 210. Based on the above, the display device 10 may additionally have a control module 400. The control module 400 may control display of the foregoing display surface 105 based on a display signal G1, and controls displacement actuation of the entire display module 100 based on an actuation signal G2.

Figure 2A:
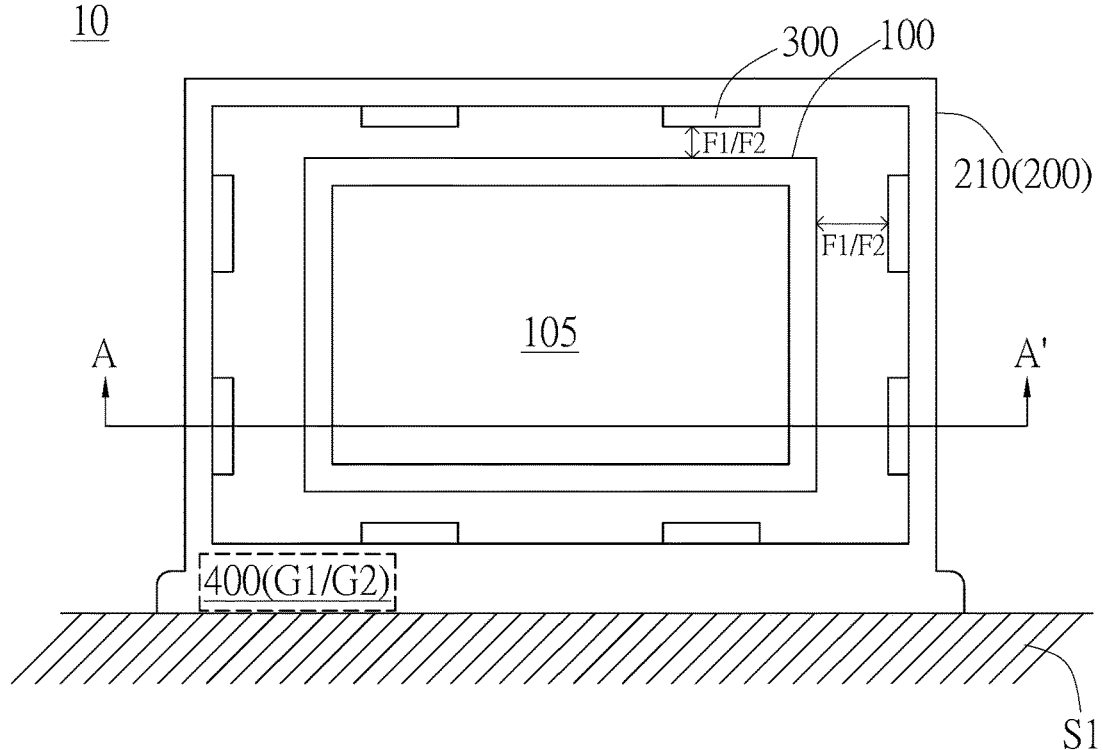
FIG. 2A is a front view of a display device viewed from the front of a display surface according to an embodiment of the present invention.
Figure 2B:
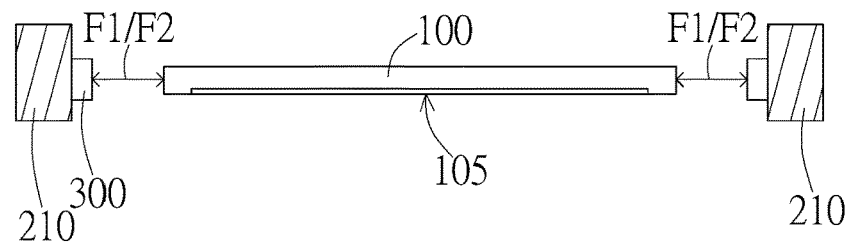
FIG. 2B is a cross-sectional view of a display device taken along a section line A-A' in FIG. 2A according to an embodiment of the present invention.

Specifically, referring to FIG. 1, FIG. 2A and FIG. 2B, the control module 400 may enable the display surface 105 to display the expected video or image based on the display signal G1, and may control each of the electromotive driving elements 300 to selectively generate an attractive force F1 and a repulsive force F2 with respect to the display module 100 based on the actuation signal G2. Based on the above, by selectively using the attractive force F1 and the repulsive force F2 generated by each of the electromotive driving elements 300 with respect to the display module 100, a distance of any specific site on the display module 100 or the entire display module 100 from the first mounting frame 210, and a setting angle of the display module 100 with respect to the setting surface S1 or a combination thereof may be changed.

According to some embodiments, as shown in FIG. 2A, the control module 400 may be mounted in the setting frame 200, for example, in the first mounting frame 210, so as to facilitate control of the display module 100 based on the display signal G1 and/or the actuation signal G2. For example, the control module 400 may transfer, by using any signal line or in a wireless manner, a signal to the display module 100 to control display of the display surface 105, and may transfer, by using any signal line or in a wireless manner, a signal to each of the electromotive driving elements 300 to control the electromotive driving element 300 to selectively generate the attractive force F1 and the repulsive force F2. However, the above settings are merely an example, and the present invention is not limited thereto. For example, the control module 400 may alternatively be spaced from the display module 100 and the setting frame 200 and be disposed in another place, and transfers, by using any signal line or in a wireless manner, signals to the display module 100 and/or the electromotive driving elements 300.

Figure 3A:
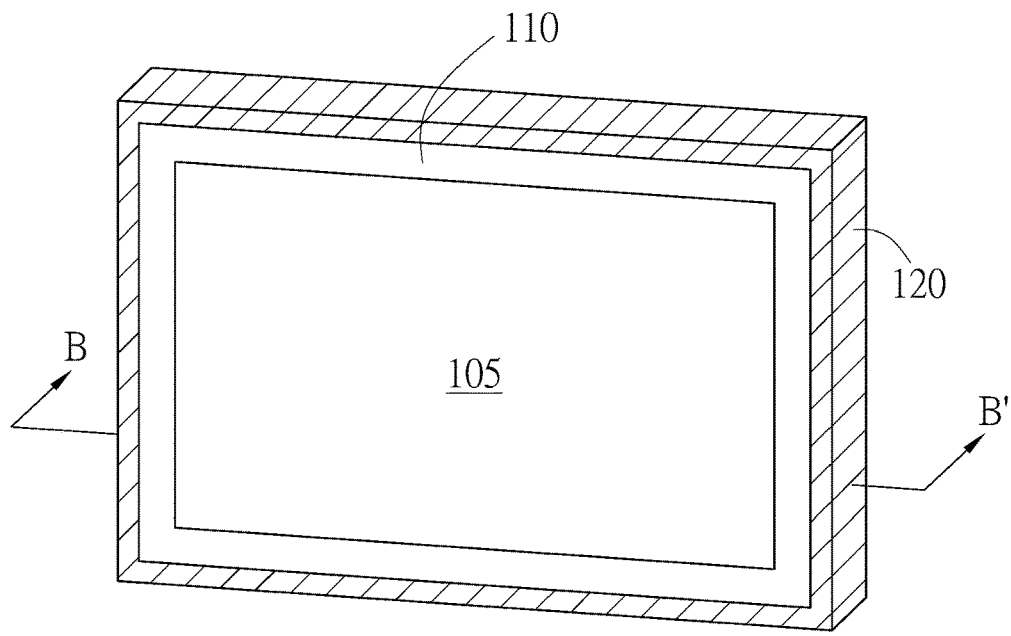
FIG. 3A is a schematic three-dimensional view of a display module of a display device according to another embodiment of the present invention.
Figure 3B:
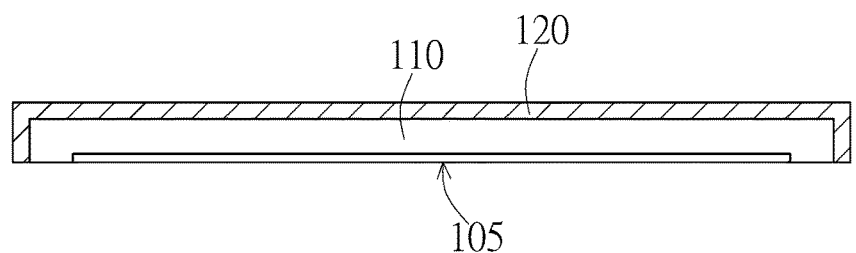
FIG. 3B is a cross-sectional view of a display module taken along a section line B-B' in FIG. 3A according to another embodiment of the present invention.

Manners for the foregoing electromotive driving element 300 to selectively generate the attractive force F1 and the repulsive force F2 are further described in detail in the following. For example, referring to FIG. 3A and FIG. 3B, according to an embodiment, a display module 100 may include a display panel 110 having a display surface 105, and a frame 120 surrounding at least one part of the display panel 110 outside the display surface 105. The frame 120 is an iron frame 120. In this case, a control module 400 may control each of the electromotive driving elements 300 to independently establish a magnetic field in a specific direction relative to the iron frame 120, so as to selectively generate an attractive force F1 and a repulsive force F2.

Figure 4A:
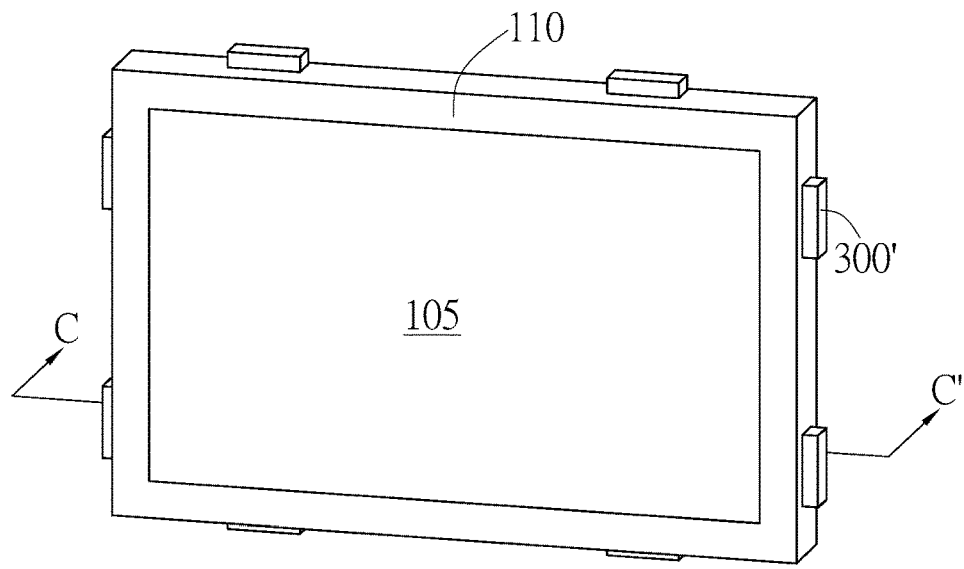
FIG. 4A is a schematic three-dimensional view of a display module of a display device according to yet another embodiment of the present invention.
Figure 4B:
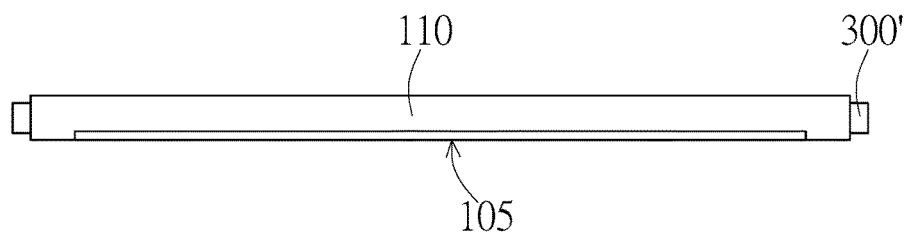
FIG. 4B is a cross-sectional view of a display module taken along a section line C-C' in FIG. 4A according to yet another embodiment of the present invention.

Alternatively, according to another embodiment of the present invention, referring to FIG. 4A and FIG. 4B, one or more stationary magnets 300' may be further included. The one or more stationary magnets 300' are respectively disposed on the display module 100 and face one or more electromotive driving elements 300. For example, the display module 100 may include a display panel 110 having a display surface 105, and the stationary magnets 300' are disposed on the display panel 110 outside the display surface 105. In this case, a control module 400 may control each of the electromotive driving elements 300 to independently establish a magnetic field in a specific direction relative to the stationary magnets 300', so as to selectively generate an attractive force F1 and a repulsive force F2.

Figure 5:
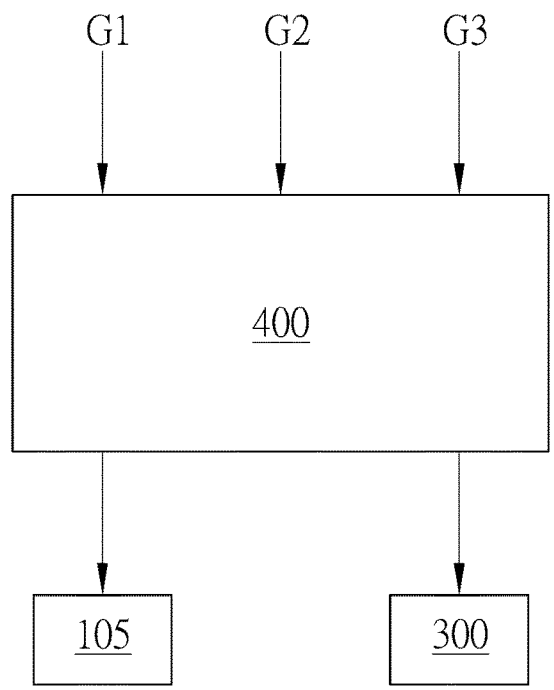
FIG. 5 is a schematic diagram showing control of display and actuation performed by a display device according to an embodiment of the present invention.

As the examples described above, by using various settings, referring to FIG. 5, after receiving a display signal G1 and an actuation signal G2, a control module 400 may respectively control a display surface 105 and the electromotive driving elements 300 to perform display and displacement. However, the above settings are merely an example, and the present invention is not limited thereto. In addition, according to some embodiments, the control module 400 may also receive another control signal G3 to perform other control.

Based on the above, the display device 10 according to this embodiment, besides a basic display function, may additionally perform displacement. For example, the displacement of shaking and swinging may be performed corresponding to displayed content such as tail whipping of a dragon. Therefore, a user may have experiences and feelings at more levels and with more interestingness.

Figure 6:
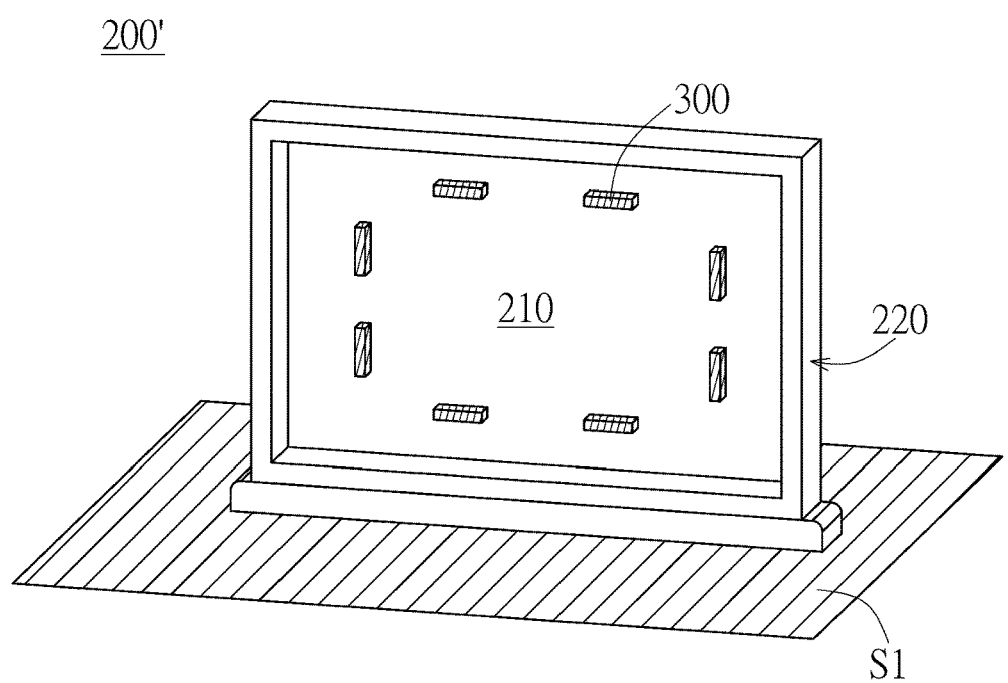
FIG. 6 is a schematic three-dimensional view of a setting frame of a display device according to another embodiment of the present invention.

Then, referring to FIG. 6, according to another embodiment of the present invention, a setting frame 200' of a display device 20 may include a first mounting frame 210 and a second mounting frame 220 disposed on a setting surface S1. Specifically, in this embodiment, the first mounting frame 210 for mounting the electromotive driving elements 300 is in the form of a back plate instead of the form of the four-sided frame shown in FIG. 1 as described above. Then, referring to both FIG. 6 and FIG. 7, the display device 20 includes a display module 100 disposed corresponding to a setting frame 200', and a back surface of the display module 100 facing away from the display surface 105 faces the first mounting frame 210. Based on the above, in this embodiment, the electromotive driving elements 300 do not generate attractive forces F1 or repulsive forces F2 for sides of the display module 100, but selectively generate attractive forces F1 and repulsive forces F2 for the back surface of the display module 100.

Figure 7:
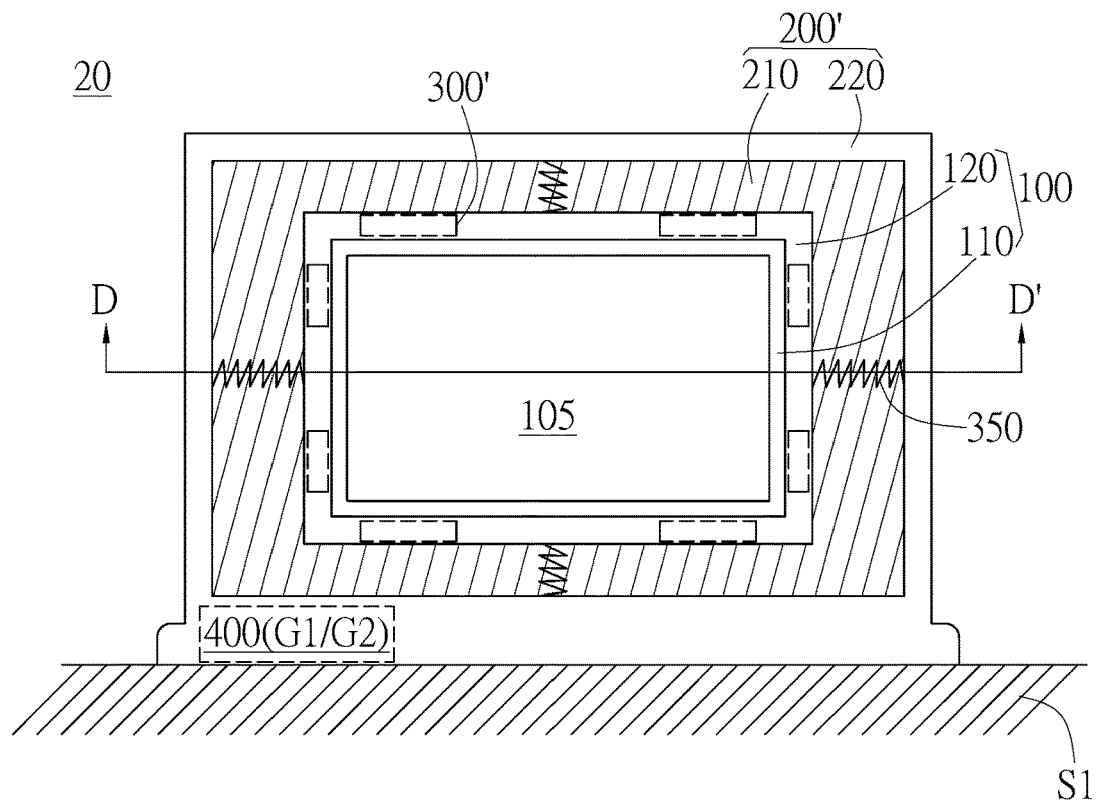
FIG. 7 is a front view of a display device viewed from the front of a display surface according to another embodiment of the present invention.
Figure 8:
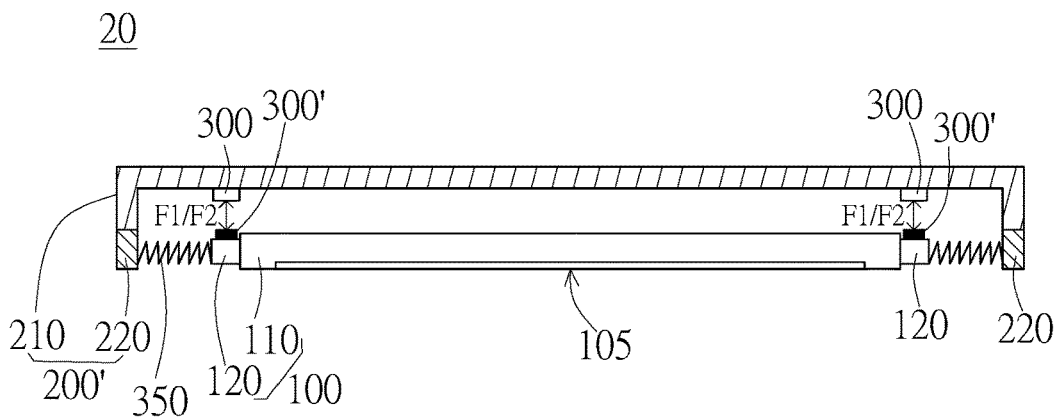
FIG. 8 is a cross-sectional view of a display device taken along a section line D-D' in FIG. 7 according to another embodiment of the present invention.

For example, referring to FIG. 7 and FIG. 8, according to this embodiment, the display module 100 may include a display panel 110 and a frame 120 such as a plastic frame 120, and a plurality of stationary magnets 300' may be disposed on a part of the frame 120 facing away from the display surface 105. Based on the above, the electromotive driving elements 300 may establish magnetic fields by using the stationary magnets 300' disposed on a back surface of the frame 120 of the display module 100, to selectively generate attractive forces F1 and repulsive forces F2. However, the present invention is not limited thereto, and this embodiment may alternatively be similar to the form shown in FIG. 3A and FIG. 3B, the form shown in FIG. 4A and FIG. 4B, or another form to selectively generate the required attractive forces F1 and repulsive forces F2.

In addition, referring FIG. 7 and FIG. 8, in this embodiment, in order to make positioning and/or repositioning of the display module 100 more stable or faster, one or more elastic elements 350 may be further included to be connected between the display module 100 and the second mounting frame 220. For example, the elastic elements 350 may be disposed on four sides of the display module 100, and be connected to the second mounting frame 220 surrounding the display module 100. In this case, although the electromotive driving elements 300 are not controlled or driven, the display module 100 may be disposed on and spaced from the setting surface S1. Further, if the electromotive driving elements 300 are controlled and driven to selectively generate the attractive forces F1 and the repulsive forces F2 respectively to perform movement, the display module 100 may also keep moving within a preset range more easily and stably, and does not deviate from a predetermined displacement target site unexpectedly. In addition, when the electromotive driving elements 300 stop generating the attractive forces F1 and the repulsive forces F2, the display module 100 may be pulled or pushed by the elastic elements 350 to return to an initial position faster.

The elastic elements 350 may be springs, elastic sheets, or the like. In addition, in some embodiments, besides the elastic elements 350, any connecting element that may connect the display module 100 and the second mounting frame 220 may be disposed, for example, an inelastic wire, support frame or support pillar, and an elastic force or gravity may be used for assisting in positioning or repositioning the display module 100. However, the above is merely an example, and the present invention is not limited to the forms specifically shown herein.

Based on the above, according to the display device 20 shown in FIG. 7 and FIG. 8, the electromotive driving elements 300 may be disposed on an outer surface of a part facing the display module 100 behind the display surface 105, and the elastic elements 350 are disposed to connect to an outer side surface of a part of the display module 100 extending along a side of the display surface 105. Therefore, the attractive forces F1 and the repulsive forces F2 may be generated in different sites for the back surface of the display module 100 by using the electromotive driving elements 300, and displacement actuation or a displacement mode different from that of the display device 10 shown in FIG. 1 may be generated.

The forms and the positions of first mounting frame 210 and the second mounting frame 220 of the foregoing setting frame 200' and the forms and the positions of the electromotive driving elements 300 and the elastic elements 350 disposed on the setting frame 200' are all merely examples, and the present invention is not limited thereto. For example, according to some embodiments, the first mounting frame 210 and the second mounting frame 220 may be in a separated form, or may be integrated with each other to be in a one-piece form. In addition, the first mounting frame 210 and the second mounting frame 220 are not limited to a form of a rectangular frame shown in the figure, and may be formed into various shapes and forms matching the shape of the display module 100, for example, a hexagon, a circle, a triangle and an irregular shape. Further, the electromotive driving elements 300 and the elastic elements 350 are respectively disposed on the first mounting frame 210 and the second mounting frame 220 in the current shown embodiments, but the present invention is not limited thereto, and the electromotive driving elements 300 and the elastic elements 350 may alternatively be jointly disposed on the first mounting frame 210, the second mounting frame 220 or both of the first mounting frame 210 and the second mounting frame 220. Similarly, as long as the display is not hampered, the elastic element 350 or the connecting element may be disposed on any position on the display module 100. In addition, in a case that the display is not hampered, the electromotive driving elements 300 may alternatively be disposed on the display module 100.

According to the present invention, if more fixed-points of the electromotive driving elements 300 are set, the display module 100 may be controlled to generate more precise actuation. In addition, according to some embodiments, the electromotive driving elements 300 may be disposed symmetrically, and the elastic elements 350 may be disposed symmetrically. In this case, the displacement actuation of the display module 100 may be controlled more evenly. However, setting positions and setting quantities of the electromotive driving elements 300 and the elastic elements 350 or the connecting elements are not limited to the various forms shown in this specification and figures without departing from the principle of the present invention.

In the following, displacement actuation or a displacement mode according to embodiments of the present invention is further described with reference to FIG. 9A to FIG. 9D.

Figure 9A:
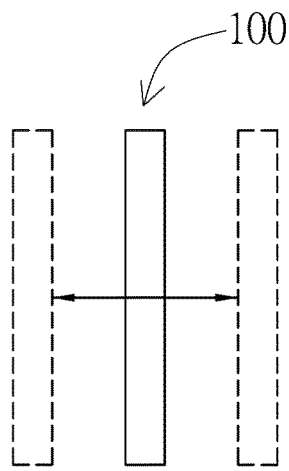
FIG. 9A to FIG. 9D are schematic diagrams of modes of performing displacement actuation by a display module of a display device according to embodiments of the present invention.
Figure 9A:
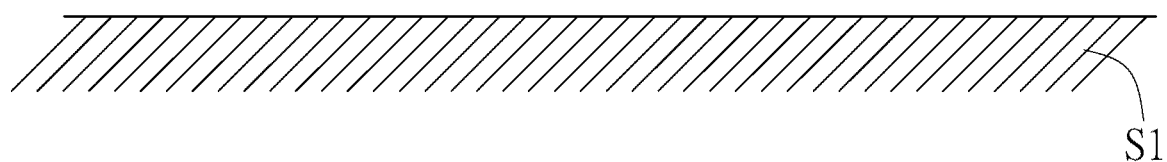
Figure 9B:
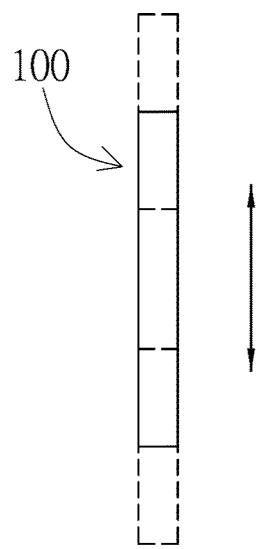
Figure 9B:
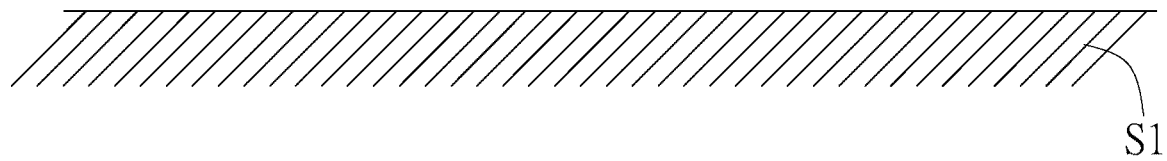
Figure 9C:
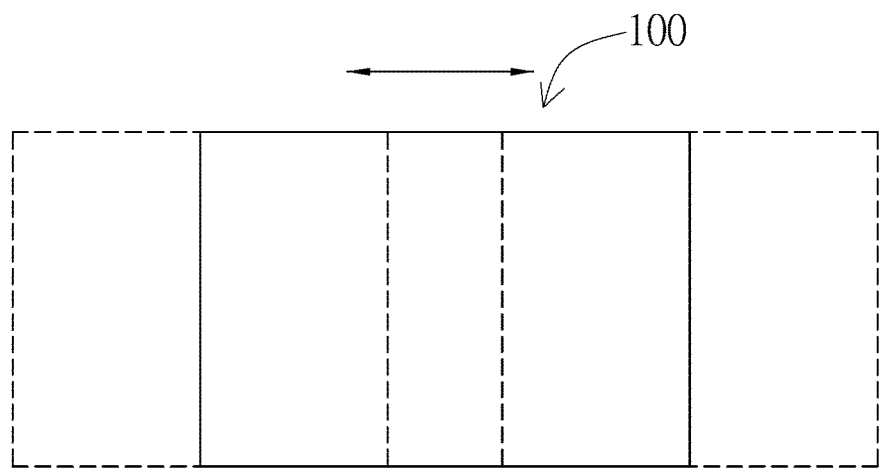
Figure 9C:
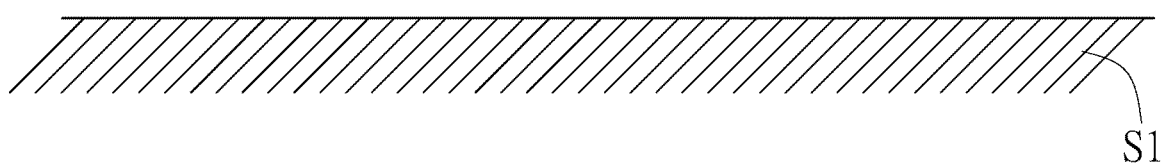
Figure 9D:
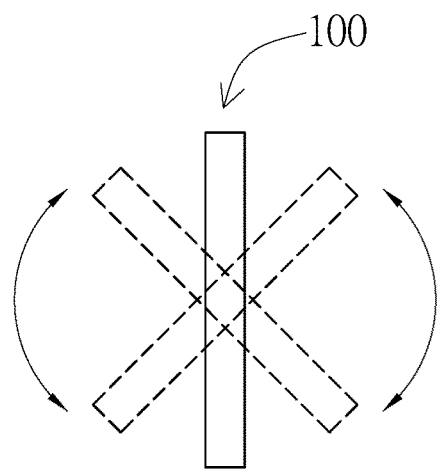
Figure 9D:
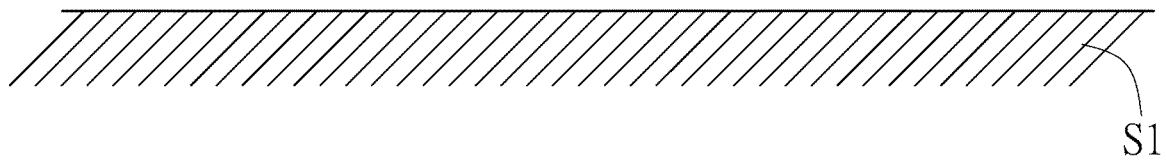

Based on the above, referring to FIG. 9A, according to an embodiment of the present invention, a display module 100 may be controlled to move back and forth along a direction in which the display surface connects the back surface. Then, referring to FIG. 9B, according to another embodiment of the present invention, a display module 100 may be controlled to move up and down along a direction parallel to the display surface or the back surface (for example, away from and close to a setting surface S1). Alternatively, referring to FIG. 9C, according to another embodiment of the present invention, a display module 100 may be controlled to move left and right along a direction parallel to the display surface or the back surface (for example, parallel to a setting surface S1). Still alternatively, referring to FIG. 9D, according to yet another embodiment of the present invention, a display module 100 may be controlled to overturn, and in a case that a central position of the display module 100 is not changed, an angle of the entire display module 100 with respect to a setting surface S1 is changed. Further, the displacement actuation or the mode of the display module 100 may alternatively be a combination of the foregoing various forms, and may alternatively repeat the actuation unidirectionally or reciprocally, and the present invention is not limited to the specific shown forms.

Based on the above, because electromotive driving elements 300 may be controlled based on a control module 400, to enable the display module 100 to generate corresponding displacement actuation, a sound effect besides a display effect may be further generated in some embodiments. Specifically, similar to diaphragm vibration of a trumpet or fast waving of an object, in a case of a specific displacement variation frequency and/or displacement angle, the display module 100 may make a corresponding sound based on displacement of the display module, for example, a buzzing sound, a whirring sound, a soughing sound or a swishing sound. Therefore, according to the embodiments, for example, a display device 10 or a display device 20 may further enrich sensory experience of a user by using displayed content, corresponding displacement and a corresponding generated sound, or a cool effect is added to the entire display device such as the display device 10 or the display device 20.

According to some embodiments of the present invention, based on the above, in consideration of sounds audible to human ears, the displacement variation frequency of the display module 100 may be between 20 Hz and 20 KHz. In addition, a fast movement manner of the display module 100 may be controlled according to a sound that needs to be generated, for example, but not limited to, various movement manners or combinations thereof shown in FIG. 9A to FIG. 9D. In addition, in an embodiment, the display device such as the display device 10 or the display device 20 may have a displacement frequency of a sound only audible to children, and thus adults cannot hear the corresponding sound. For example, the display device such as the display device 10 or the display device 20 is used as an alarm clock.

Based on the above, according to the display device of the embodiments of the present invention, for example, the display device 10 or the display device 20 may be used as a display of a billboard, a sign board, an alarm clock, an electronic pet, an electronic calendar or a video game, to generate multi-level effects of display, displacement and even sound. However, the above is merely an example, and the present invention is not limited to the specific stated application types.

Figure 10:
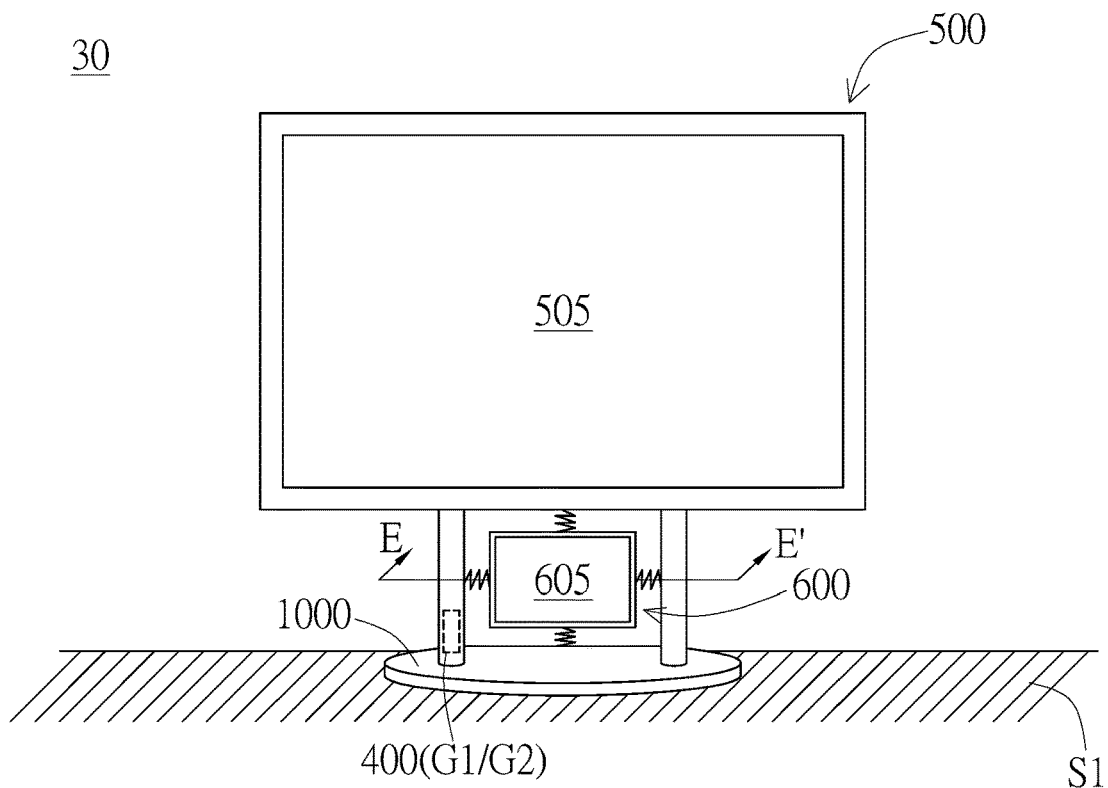
FIG. 10 is a schematic diagram of a display device having a first display module and a second display module according to an embodiment of the present invention.

For example, referring to FIG. 10, according to another embodiment of the present invention, a display device 30 may include a housing seat 1000 disposed on a setting surface S1, a first display module 500 having a first display surface 505 and disposed on the housing seat 1000, and a second display module 600 having a second display surface 605 and movably disposed on the housing seat 1000. In this embodiment, the first display module 500 may be, for example, a main display module of a display for electronic sports, and the second display module 600 may be, for example, a sub-display module of a display for electronic sports, and is the same as or similar to the displaceable display module in the foregoing embodiments.

Herein, the second display module 600 shown in FIG. 10 is disposed corresponding to the housing seat 1000 (for example, a base) under the first display module 500, but the present invention is not limited thereto. For example, the second display module 600 may alternatively be disposed corresponding to the housing seat 1000 (for example, a back housing) behind the first display module 500, or the second display module 600 may alternatively be disposed at any other place relative to the first display module 500.

According to this embodiment, the display device 30 may further include one or more electromotive driving elements 300 and a control module 400. The one or more electromotive driving elements 300 are disposed on the housing seat 1000, and face the second display module 600 relatively, and the control module 400 may control display of the second display surface 605 based on a display signal G1, and control the electromotive driving elements 300 based on an actuation signal G2. Specifically, the control module 400 may control each of the electromotive driving elements 300 to selectively generate an attractive force F1 and a repulsive force F2 with respect to the second display module 600 based on the actuation signal G2. Therefore, a distance of any site on the second display module 600 or the entire second display module 600 from the housing seat 1000, a setting angle of the second display module 600 with respect to the setting surface S1, or a combination thereof may be changed.

Similar to the foregoing embodiments, the control module 400 of the display device 30 may be, for example, disposed in the housing seat 1000, or may alternatively be disposed on and spaced from the housing seat 1000. Based on the above, the present invention is not limited to the specific stated form shown in FIG. 10. In addition, details that are the same as or similar to those in the foregoing embodiments are not described in the following again.

Figure 11:
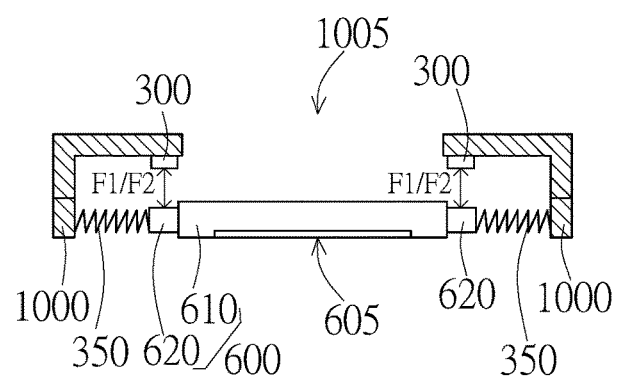
FIG. 11 is a cross-sectional view of a second display module taken along a section line E-E' in FIG. 10 according to an embodiment of the present invention.

Referring to FIG. 10 and FIG. 11, according to this embodiment, the second display module 600 may include a second display panel 610 having a second display surface 605, and a frame 620 surrounding at least one part of the second display panel 610 outside the second display surface 605. The frame 620 is an iron frame 620, and the electromotive driving elements 300 may establish magnetic fields with respect to the iron frame 620, to selectively generate attractive forces F1 and repulsive forces F2. However, the present invention is not limited to this configuration, and the configurations discussed in the above embodiments or configurations or manners based on a similar concept are all applicable to this embodiment. For example, according to another embodiment, one or more stationary magnets 300' may be further included to respectively face the one or more electromotive driving elements 300 and are disposed on the second display module 600, and each of the electromotive driving elements 300 independently establish magnetic fields respectively with respect to the stationary magnets 300' to selectively generate attractive forces F1 and repulsive forces F2.

In addition, similarly, the display device 30 may further include one or more elastic elements 350 and/or other connecting elements connected between the second display module 600 and the housing seat 1000. For example, the electromotive driving elements 300 may be disposed to face an outer surface of a part of the second display module 600 behind the second display surface 605, and the elastic elements 350 and/or other connecting elements are disposed to connect to an outer side surface of a part of the second display module 600 extending along a side of the second display surface 605. In some embodiments, the electromotive driving elements 300 may be disposed symmetrically, and the elastic elements 350 may be disposed symmetrically.

Same as or similar to the foregoing embodiments, referring to the embodiments shown in FIG. 10 and FIG. 11, the electromotive driving elements 300 may be controlled based on the control module 400, to enable the second display module 600 to generate corresponding fast displacement actuation, so as to further generate a sound effect, for example, a buzzing sound, a whirring sound, a soughing sound or a swishing sound. In an embodiment, in consideration of sounds audible to human ears, displacement variation frequency of the second display module 600 may be between 20 Hz and 20 KHz, but the present invention is not limited thereto.

Figure 12A:
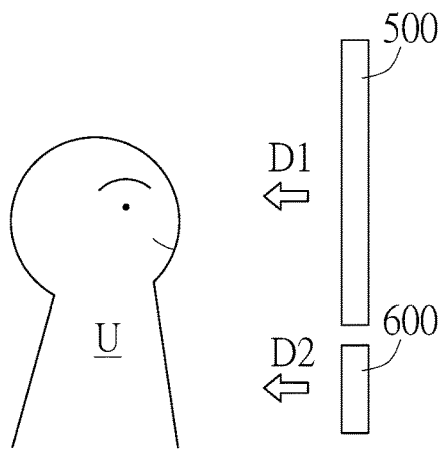
FIG. 12A to FIG. 12C are schematic diagrams of display directions of a first display module and a second display module of a display device respectively during display according to embodiments of the present invention.
Figure 12B:
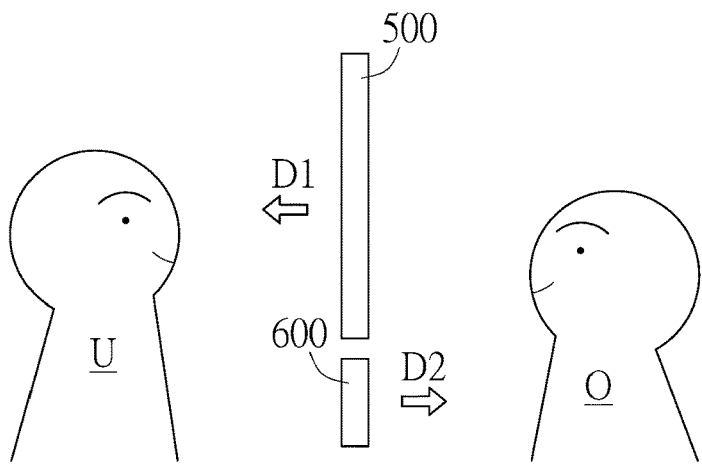
Figure 12C:
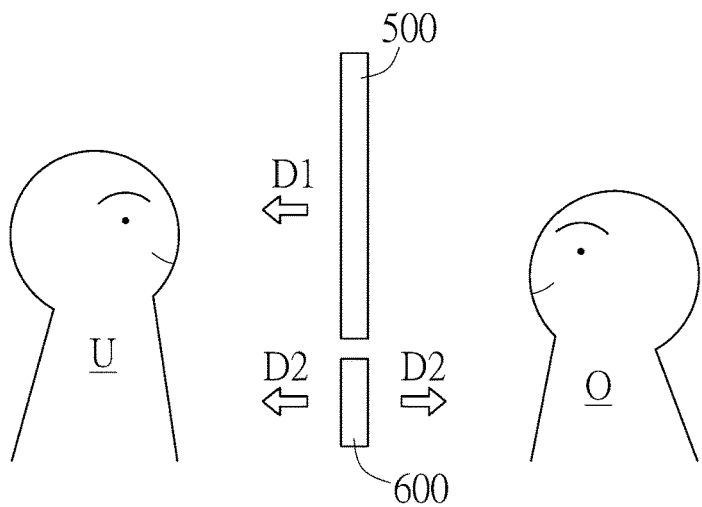

In addition, according to this embodiment, on a side corresponding to a back surface of the first display module 500, the housing seat 1000 may have an opening 1005 corresponding to the second display module 600. In this case, a video displayed on the second display surface 605 may be displayed on a back surface of the display device 30 through the opening 1005. Specifically, referring to FIG. 12A, in some embodiments, respective display directions D1 and D2 of the first display module 500 and the second display module 600 may both face a user U. Then, referring to FIG. 12B, in some other embodiments, the display direction D1 of the first display module 500 may face the user U, and the display direction D2 of the second display module 600 may face a viewer O in front of the back surface of the display device 30. That is, the second display surface 605 of the second display module 600 may be different from that shown in FIG. 11 and be located in front of a surface close to the opening 1005, to enable content displayed by the second display module 600 to be viewed by the viewer O through the opening 1005. Alternatively, referring to FIG. 12C, according to still some other embodiments, the second display module 600 may be a double-sided display module, and may display a video or an image towards a front surface and a back surface at the same time. Based on the above, in this embodiment, the display direction D1 of the first display module 500 may face the user U, and the display direction D2 of the second display module 600 may face the user U and the viewer O in front of different surfaces at the same time.

In addition, according to an embodiment of the present invention, the foregoing displaceable display module (for example, the display module 100 or the second display module 600) may alternatively be a transparent display module. Therefore, the display module can merge into the background to be hidden when display is not performed. Alternatively, the display module can keep transparent during displaying, so as to perform display by using a display surface, that is, persons in front of both the front surface and the back surface can see the displayed content.

Referring to schematic diagrams shown in FIG. 13A and FIG. 13B, control modes of controlling a first display module 500 and a second display module 600 in a display device 30 are further described in the following.

Figure 13A:
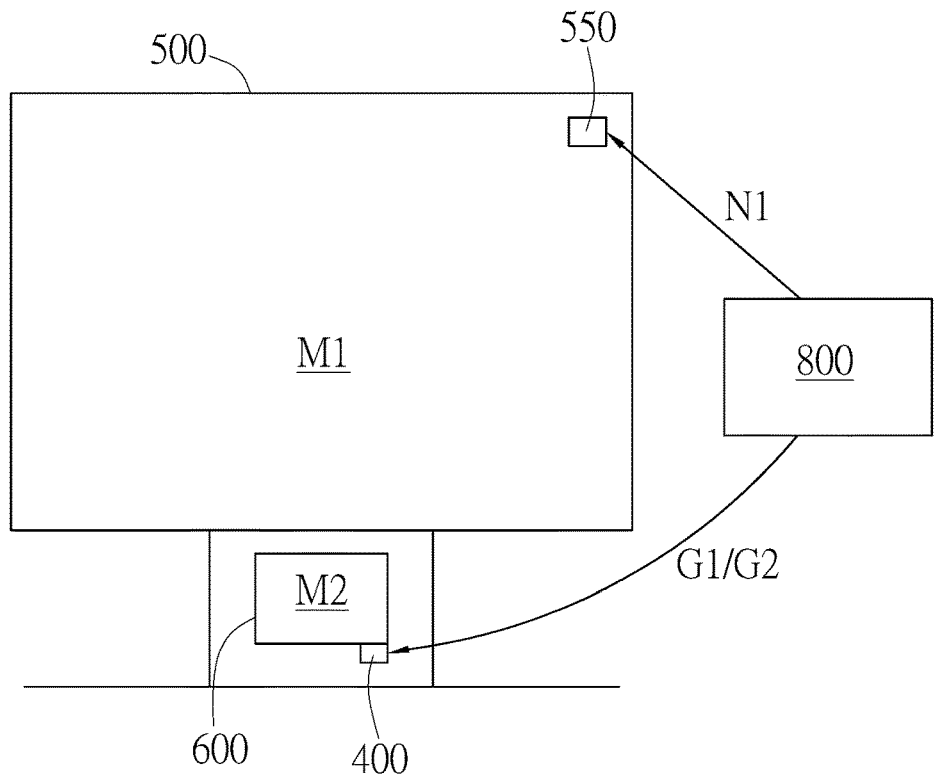
FIG. 13A and FIG. 13B are schematic diagrams of modes of controlling a first display module and a second display module according to embodiments of the present invention.

Based on the above, in an embodiment, as shown in FIG. 13A, the display device 30 may further include a main processing module 800 and a sub-processing module 550. The main processing module 800 may transmit a first display signal N1 to the sub-processing module 550, and transmit a display signal G1 and an actuation signal G2 to a control module 400. Specifically, the main processing module 800 may separately transmit different signals to be respectively transferred to the sub-processing module 550 corresponding to the first display module 500, and the control module 400 corresponding to the second display module 600. In this case, the sub-processing module 550 may control the first display module 500 to display a first picture M1 based on the first display signal N1, and the control module 400 may control the second display module 600 to display a second picture M2 based on the display signal G1.

Figure 13B:
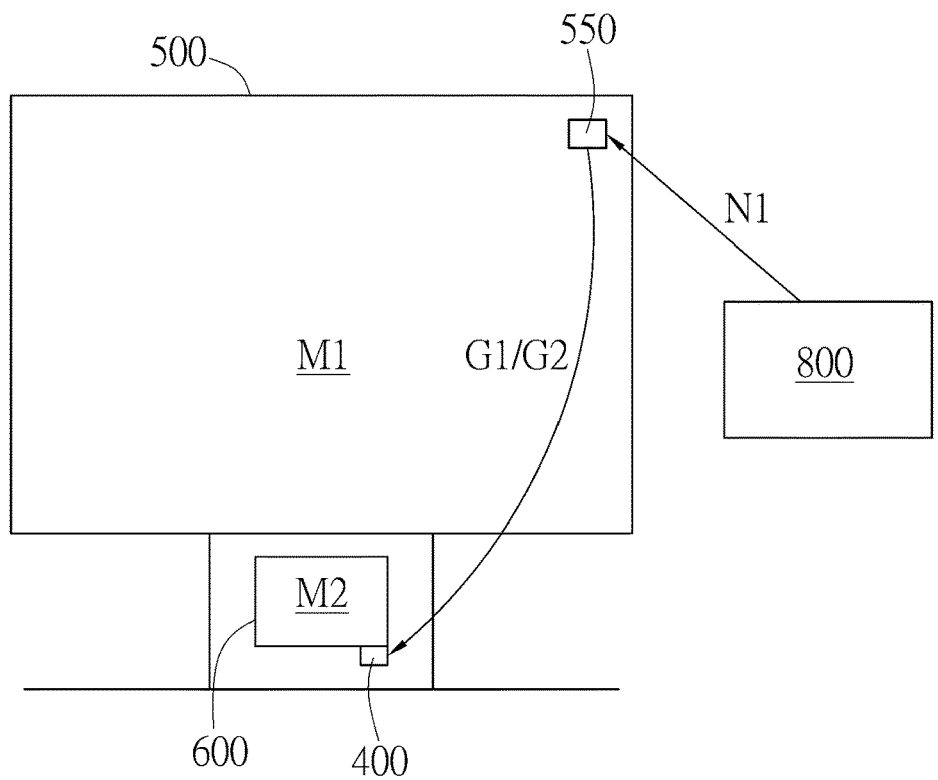

Alternatively, in another embodiment, as shown in FIG. 13B, the display device 30 may further include a main processing module 800 and a sub-processing module 550. The main processing module 800 may transmit a first display signal N1 to the sub-processing module 550, and the sub-processing module 550 may transmit a display signal G1 and an actuation signal G2 to a control module 400 accordingly. That is, according to this embodiment, the main processing module 800 may transmit a signal to the sub-processing module 550 corresponding to the first display module 500, and then corresponding to the signal, the sub-processing module 550 corresponding to the first display module 500 generates and transmits a signal to the control module 400 corresponding to the second display module 600. In this case, the sub-processing module 550 may control the first display module 500 to display a first picture M1 based on the first display signal N1, and the control module 400 may control the second display module 600 to display a second picture M2 based on the display signal G1.

In the foregoing embodiments, the display signal G1 may be generated based on the first display signal N1. For example, the main processing module 800 may generate the display signal G1 and/or the actuation signal G2 based on the first display signal N1, and transfer the display signal G1 and/or the actuation signal G2 to the control module 400 corresponding to the second display module 600. Alternatively, the sub-processing module 550 may generate a display signal G1 and/or the actuation signal G2 based on the first display signal N1 received from the main processing module 800, and then transfer the display signal G1 and/or the actuation signal G2 to the control module 400 corresponding to the second display module 600. Therefore, the display signal G1 and/or the actuation signal G2 may correspond to or match the first display signal N1.

Figure 14A:
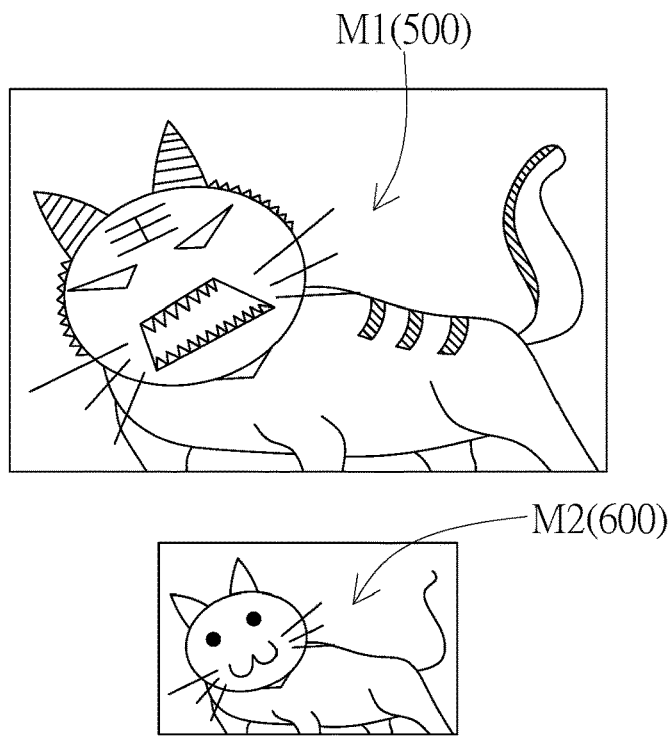
FIG. 14A and FIG. 14B are schematic diagrams in which a first display module and a second display module of a display device according to embodiments of the present invention are interlinked with each other to display a corresponding theme.
Figure 14B:
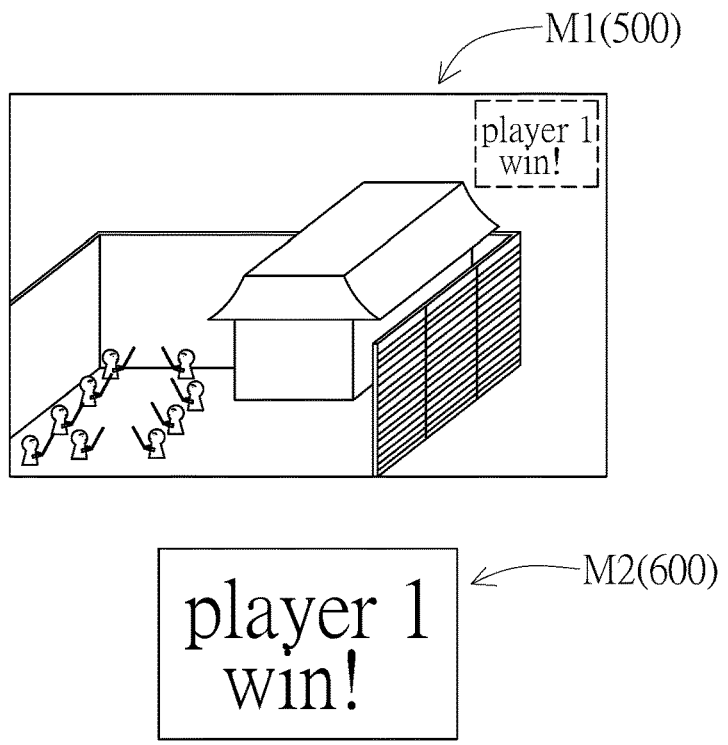

By using the foregoing manner, according to the embodiments shown in FIG. 13A and FIG. 13B, the first picture M1 displayed by the first display module 500 and the second picture M2 displayed by the second display module 600 may be interlinked with each other to display a corresponding theme. For example, referring to FIG. 14A, according to an embodiment, the shown first picture M1 may be a detailed or an original image or video, and the shown second picture M2 may be a simplified version or a cute version image or video corresponding to the shown first picture M1. In another example, referring to FIG. 14B, according to another embodiment, when the sub-processing module 550 generates the display signal G1, the second picture M2 may alternatively be a partial picture captured from the first picture M1, for example, key scoreboard information. However, the forms that the first picture M1 and the second picture M2 may be interlinked with each other to display a corresponding theme are all merely examples, and the present invention is not limited thereto.

In addition, in some embodiments, in the display device of the foregoing embodiments, the display signal G1 and the actuation signal G2 may not match or match each other. For example, no matter what displayed picture is determined to be displayed by the display signal G1, displacement actuation controlled by the actuation signal G2 is wavy swinging. Alternatively, in a case that in the displayed picture determined to be displayed by the display signal G1, a person is attacked or scores, the displacement actuation controlled by the actuation signal G2 generates swinging or overturning correspondingly. Alternatively, in a case that in the displayed picture determined to be displayed by the display signal G1, a monster is roaring, the displacement actuation controlled by the actuation signal G2 generates vibration and enables the entirety to generate a buzzing sound correspondingly. Based on the above, the second display module 600 may selectively present different display, displacement and sound effects with variations of display scenarios of the first display module 500, and an implementation application of the present invention may be not limited thereto.

In conclusion, the display device of the embodiments of the present invention may be not limited to fixed image of video display, and may fast change a setting position or a display surface angle of the display device, thereby generating displacement or even a sound effect besides basic change of display content. Therefore, by using a relatively simple structure, richer sound, light and displacement effects at more levels may be generated. In this case, requirements of a user for more experiences and feelings from a display device may be improved or met, and for example, the display device may be used in technical fields requiring a cool effect or an interesting effect, for example, electronic sports, games and interactive devices, thereby increasing applicability of the display device.

The above are merely some exemplary embodiments of the present invention. It should be noted that various variations and amendments may be made to the present invention without departing from the spirit and the principle of the present invention. A person of ordinary skill in the art should understand that the present invention is defined by the attached claims, and in a case of complying with the intention of the present invention, various possible changes such as substitutions, combinations, modifications and diversions fall within the scope of the present invention as defined in the attached claims.

REFERENCE NUMERALS 10, 20, 30: Display device
100: Display module
105: Display surface
110: Display panel
120: Frame
200, 200': Setting frame
210: First mounting frame
220: Second mounting frame
300: Electromotive driving element
300': Stationary magnet
350: Elastic element
400: Control module
500: First display module
505: First display surface
550: Sub-processing module
600: Second display module
605: Second display surface
610: Second display panel
620: Frame
800: Main processing module
1000: Housing seat
1005: Opening
S1: Setting surface
G1: Display signal
G2: Actuation signal
G3: Another control signal
N1: First display signal
F1: Attractive force
F2: Repulsive force
M1: First picture
M2: Second picture
D1, D2: Display direction
U: User
O: Viewer

What is claimed is:

1. A display device, comprising:
a display module, disposed on and spaced from a setting surface and having a display surface;
a first mounting frame, spaced from the display module and disposed on the setting surface;
one or more electromotive driving elements, disposed on the first mounting frame and facing the display module relatively; and
a control module, controlling display of the display surface based on a display signal, and controlling each of the electromotive driving elements to selectively generate an attractive force and a repulsive force with respect to the display module based on an actuation signal, so as to change a distance of the display module from the first mounting frame, a setting angle of the display module with respect to the setting surface, or a combination thereof.

2. The display device according to claim 1, wherein the display module comprises a display panel having the display surface, and a frame surrounding at least one part of the display panel outside the display surface,
wherein the frame is an iron frame, and the control module controls the electromotive driving elements to establish magnetic fields with respect to the iron frame to selectively generate attractive forces and repulsive forces.

3. The display device according to claim 1, further comprising one or more stationary magnets respectively facing the one or more electromotive driving elements and disposed on the display module, wherein the control module controls the electromotive driving elements to establish magnetic fields with respect to the stationary magnets to selectively generate attractive forces and repulsive forces.

4. The display device according to claim 1, further comprising one or more elastic elements, and a second mounting frame disposed on the setting surface, wherein the elastic elements are connected between the display module and the second mounting frame.

5. The display device according to claim 4, wherein the electromotive driving elements are disposed to face an outer surface of a part of the display module behind the display surface, and the elastic elements are disposed to connect an outer side surface of a part of the display module extending along a side of the display surface.

6. The display device according to claim 5, wherein the electromotive driving elements are symmetrically disposed and the elastic elements are symmetrically disposed.

7. The display device according to claim 1, wherein displacement variation frequency of the display module is between 20 Hz and 20 KHz.

8. A display device, comprising:
a housing seat, disposed on a setting surface;
a first display module, disposed on the housing seat, and having a first display surface;
a second display module, movably disposed on the housing seat, and having a second display surface;
one or more electromotive driving elements, disposed on the housing seat and facing the second display module relatively; and
a control module, controlling display of the second display surface based on a display signal, and controlling each of the electromotive driving elements to selectively generate an attractive force and a repulsive force with respect to the second display module based on an actuation signal, so as to change a distance of the second display module from the housing seat, a setting angle of the second display module with respect to the setting surface, or a combination thereof.

9. The display device according to claim 8, wherein the second display module comprises a second display panel having the second display surface, and a frame surrounding at least one part of the second display panel outside the second display surface,
wherein the frame is an iron frame, and the electromotive driving elements establish magnetic fields with respect to the iron frame to selectively generate attractive forces and repulsive forces.

10. The display device according to claim 8, further comprising one or more stationary magnets respectively facing the one or more electromotive driving elements and disposed on the second display module, wherein the electromotive driving elements establish magnetic fields with respect to the stationary magnets to selectively generate an attractive force and a repulsive force.

11. The display device according to claim 8, further comprising one or more elastic elements, wherein the elastic elements are connected between the second display module and the housing seat.

12. The display device according to claim 11, wherein the electromotive driving elements are disposed to face an outer surface of a part of the second display module behind the second display surface, and the elastic elements are disposed to connect an outer side surface of a part of the second display module extending along a side of the second display surface.

13. The display device according to claim 12, wherein the electromotive driving elements are symmetrically disposed and the elastic elements are symmetrically disposed.

14. The display device according to claim 8, wherein displacement variation frequency of the second display module is between 20 Hz and 20 KHz.

15. The display device according to claim 8, further comprising a main processing module and a sub-processing module, wherein
the main processing module transmits a first display signal to the sub-processing module, and transmits the display signal and the actuation signal to the control module, wherein
the sub-processing module controls the first display module to display a first picture based on the first display signal, and the control module controls the second display module to display a second picture based on the display signal, and wherein
the first picture and the second picture are interlinked with each other to display a corresponding theme.

16. The display device according to claim 15, wherein the display signal is generated based on the first display signal.

17. The display device according to claim 8, further comprising a main processing module and a sub-processing module, wherein
the main processing module transmits a first display signal to the sub-processing module, and the sub-processing module transmits the display signal and the actuation signal to the control module, wherein
the sub-processing module controls the first display module to display a first picture based on the first display signal, and the control module controls the second display module to display a second picture based on the display signal.

18. The display device according to claim 17, wherein the display signal is generated based on the first display signal.

19. The display device according to claim 17, wherein the first picture and the second picture are interlinked with each other to display a corresponding theme.

20. The display device according to claim 19, wherein the second picture is a partial picture captured from the first picture.

* * * * *